(12) United States Patent
Eidson

(10) Patent No.: US 6,351,486 B1
(45) Date of Patent: Feb. 26, 2002

(54) ACCELERATED SELECTION OF A BASE STATION IN A WIRELESS COMMUNICATION SYSTEM

(75) Inventor: Donald Brian Eidson, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/318,525

(22) Filed: May 25, 1999

(51) Int. Cl.[7] .............................. A61F 2/06; H04L 27/30
(52) U.S. Cl. ........................................ 375/150; 370/335
(58) Field of Search .............................. 375/130, 132, 375/133, 136, 140, 141, 142, 147, 150, 367; 370/342, 335, 503, 515, 516, 328, 331–334

(56) References Cited

U.S. PATENT DOCUMENTS

| | | | |
|---|---|---|---|
| 5,253,268 A | | 10/1993 | Omura et al. ................... 375/1 |
| 5,548,613 A | * | 8/1996 | Kaku et al. ................. 375/150 |
| 5,550,811 A | * | 8/1996 | Kaku et al. ................. 370/342 |
| 5,608,722 A | | 1/1997 | Miller ......................... 370/320 |
| 5,644,591 A | | 1/1997 | Sutton ......................... 375/200 |
| 5,642,377 A | | 6/1997 | Chung et al. ............... 375/145 |
| 5,737,329 A | | 4/1998 | Horigichi ................... 370/342 |
| 5,832,021 A | * | 11/1998 | Kondo ........................ 375/130 |
| 5,956,328 A | * | 9/1999 | Sato ............................ 370/335 |
| 5,970,084 A | * | 10/1999 | Honda ........................ 375/147 |
| 5,995,537 A | * | 11/1999 | Kondo ........................ 375/130 |
| 6,047,016 A | * | 4/2000 | Ramberg et al. ............ 375/130 |
| 6,064,688 A | * | 5/2000 | Yanagi ........................ 375/149 |

* cited by examiner

Primary Examiner—Jean Corrielus
(74) Attorney, Agent, or Firm—Thomas, Kayden, Horstemeyer & Risley, LLP (57) ABSTRACT

A mobile wireless transceiver selects one of multiple nearby base stations to facilitate communication over a wireless network. Each base station transmits a pilot signal that includes a spreading signal transmitted at one of many possible phase offsets. The wireless transceiver selects an initial one of the possible phase offsets of the spreading signal and then correlates a received signal against the spreading signal at consecutive ones of the possible phase offsets. Correlation begins at the selected initial phase offset and continues until a component of the received signal and the spreading signal are aligned, indicating the detection of the pilot signal from one of the base stations. The transceiver then selects a non-consecutive one of the possible phase offsets of the spreading signal and correlates the received signal against the spreading signal at this non-consecutive phase offset to determine whether any other component of the received signal is aligned with the spreading signal at the selected non-consecutive phase offset.

49 Claims, 4 Drawing Sheets

FIG. 4

ACCELERATED SELECTION OF A BASE STATION IN A WIRELESS COMMUNICATION SYSTEM

TECHNICAL FIELD OF THE INVENTION

This invention relates to wireless communication systems, and more particularly to the accelerated selection of a base station by a digital wireless transceiver.

BACKGROUND OF THE INVENTION

Upon powering up, a mobile wireless transceiver, or mobile station, must establish communication with a base station in a wireless network before the mobile station can begin communicating over the wireless network. The mobile station usually searches for the nearest base station, or the station with the strongest signal, to ensure quality communication.

Many digital wireless units, such as CDMA handsets, rely on a digital spreading sequence to spread transmitted signals over a wide range of frequencies, a technique commonly known as direct sequence spread spectrum (DSSS) communication. In general, the spreading sequence is a series of binary units, or chips, that repeats itself with period T. The spreading sequence is produced by a pseudo random sequence generator, such as a linear feedback shift register.

In a typical DSSS system, such as a CDMA network, each base station transmits a pilot signal generated by digitally spreading a constant sequence (e.g., all zeroes). In general, one spreading sequence is used for all base stations in a network, but a timing offset exists between the base stations. As a result, the spreading sequences of the various base stations are not time-aligned, even though their time evolution is identical.

To establish communication with the nearest base station, a mobile unit first must detect the base station's pilot signal. This process requires time aligning the spreading sequence generated in the mobile unit with the spreading sequence generated in the base station (known as "despreading"). In general, the mobile unit does this by searching for signals at all possible code phases (initial conditions or time offsets) of the spreading sequence and then aligning itself with the code phase associated with the base station producing the strongest signal.

By way of example, a typical wireless CDMA network uses a spreading sequence that repeats itself every $2^{15}$ chips, and thus has $2^{15}$ distinct code phases. To ensure fine enough sampling, ½-chip code phase sampling is usually required. In IS-95, the chip rate is approximately 1.23 MHZ. For this type of system, an exhaustive search to discover the best ½-chip sample code phase could take as long as approximately 3.4 seconds to complete. Other factors often lengthen this delay. Most wireless customers are not willing to tolerate such long delays in service.

Many mobile stations reduce search time by using several correlators to search several code phases at once, a technique that increases a unit's power consumption over the course of the search. Thus, while the delay in service at start-up is reduced, the mobile unit's battery life also is reduced because it must power more circuitry.

SUMMARY OF THE INVENTION

The invention, in its various aspects and several embodiments, reduces the search-and-acquisition time and power consumption of a wireless mobile unit during the unit's search for a nearby base station, such as a CDMA base station. In many cases, the invention also improves "hard-handover" of an established communication as the mobile unit moves from one wireless network to another (e.g., from an AMPS network to a CDMA network). In most situations search time is reduced by at least one-half, and it frequently is improved by as much as thirty-fold, without the addition of additional signal processing circuitry. As a result, wireless customers experience a shorter delay in service at power-up without a reduction in battery life.

In certain aspects, the invention involves selecting one of multiple nearby base stations to facilitate communication over a wireless network. Each base station transmits a pilot signal that includes a spreading signal transmitted at one of many possible phase offsets. A wireless receiver implementing the invention selects an initial one of the possible phase offsets of the spreading signal and then correlates a received signal against the spreading signal at consecutive ones of the possible phase offsets. Correlation begins at the selected initial phase offset and continues until a component of the received signal and the spreading signal are aligned, indicating the detection of the pilot signal from one of the base stations. The receiver then selects a non-consecutive one of the possible phase offsets of the spreading signal and correlates the received signal against the spreading signal at this non-consecutive phase offset to determine whether any other component of the received signal is aligned with the spreading signal at the selected non-consecutive phase offset.

In certain embodiments, if no component of the received signal is aligned with the spreading signal at the selected non-consecutive phase offset, the receiver correlates the received signal against consecutive ones of the possible phase offsets, beginning at the selected non-consecutive phase offset, until another component of the received signal is aligned with the spreading signal. The receiver then selects another non-consecutive one of the possible code phases at which to correlate the spreading signal against the received signal. In general, the selected initial phase offset and the selected non-consecutive phase offsets are separated from each other by a predetermined number of possible phase offsets. In many systems, such as CDMA networks, the possible phase offsets are equally spaced.

In some embodiments, the receiver selects the base station that produces the pilot signal having the greatest received signal strength and ignores any pilot signal with a received signal strength that is below a predetermined threshold. In other embodiments, selecting a non-consecutive one of the possible phase offsets includes selecting a phase offset at which a pilot signal is expected to occur and defining an aperture that begins a predetermined number of chips of the spreading signal before the selected phase offset and ends a predetermined number of chips of the spreading signal after the selected phase offset. Some embodiments use an aperture that has equal numbers of chips before and after the selected phase offset, and other embodiments use an aperture that has unequal numbers of chips before and after the selected phase offset. The signals are correlated across the aperture to allow for propagation delay in the received signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
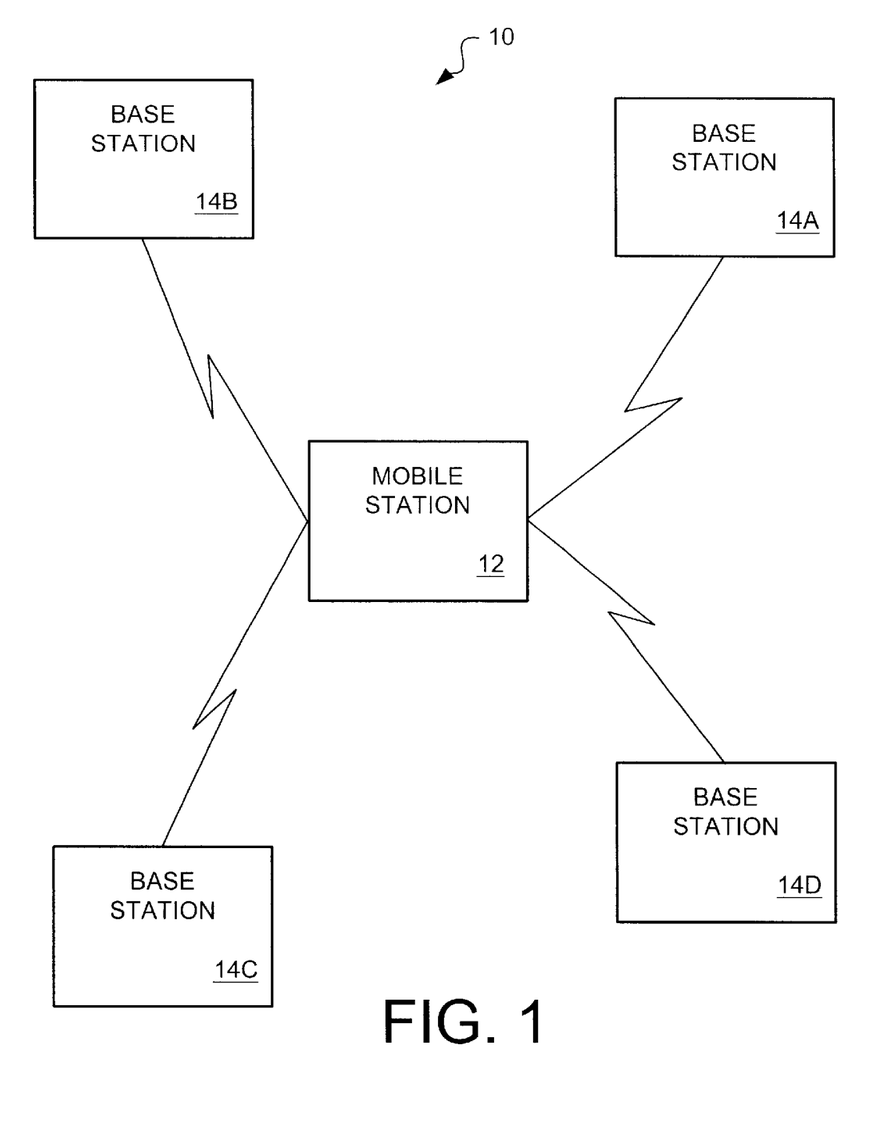
FIG. 1 is a block diagram of a mobile station in the vicinity of several base stations in a wireless communication network.

FIG. 1 shows a digital wireless network 10 in which a mobile station 12, such as a CDMA handset, is within the range of several base stations 14A–D. Upon powering up, the mobile station 12 searches for pilot signals generated by the base stations 14A–D and, upon detecting the pilot signals, configures itself for communication with the nearest base station 14A. In a CDMA network, the mobile station 12 detects the pilot signal from a base station only when the mobile station is in near-alignment with the spreading sequence code phase at which the base station transmits its pilot signal. To ensure detection of all or almost all of the nearby base stations 14A–D, the mobile station 12 searches at several selected code phases, correlating all incoming signals against the spreading sequence at each of the selected code phases.

Unlike conventional wireless units, the mobile station 12 does not perform an exhaustive search of all possible code phases. Instead, the mobile station 12, after beginning its search at a selected code phase, searches consecutive code phases only until one pilot signal is found, and soon thereafter hops to another, non-consecutive code phase to begin searching for another pilot signal. The mobile station continues hopping in this manner to a non-consecutive code phase each time it detects a pilot signal. The mobile station stops its search when it detects a pilot signal of particular strength or when it has searched all code phases of the spreading sequence. The mobile station 12 then configures itself for communication with the nearest base station 14A by aligning itself with the code phase of the strongest pilot signal.

The mobile station can search in this manner, hopping from one code phase to a non-consecutive code phase, because a CDMA network generally assigns very few of the spreading sequence code phases for use by the base stations, and because the network usually assigns code phases that are spaced uniformly and discretely across the spreading sequence. For example, a typical CDMA network assigns only 512 of $2^{15}$ (or 32,768) possible code phases and spaces the assigned code phases by intervals of approximately 64 chips. Moreover, the spreading sequences transmitted by base stations in many wireless systems, including CDMA networks, are synchronized upon transmission. The only timing inaccuracies that occur at the mobile station result from propagation delays between the base stations and the mobile station. A mobile station that takes advantage of these characteristics reduces its search-and-acquisition time, hard-handover time, and power consumption.

Because propagation delays can cause timing inaccuracies among the pilot signals, the mobile station searches over a finite window, or aperture, of code phases surrounding each code phase at which it expects to find a pilot signal. As the mobile station finds increasingly strong pilot signals, it reduces the size of the aperture, because the mobile station is interested only in acquiring pilot signals from base stations that are closer than the station that produced the strongest acquired pilot signal. Propagation delays are smaller for closer base stations, and the window of uncertainty is reduced proportionately. Defining the aperture size is described in more detail below.

Figure 2:
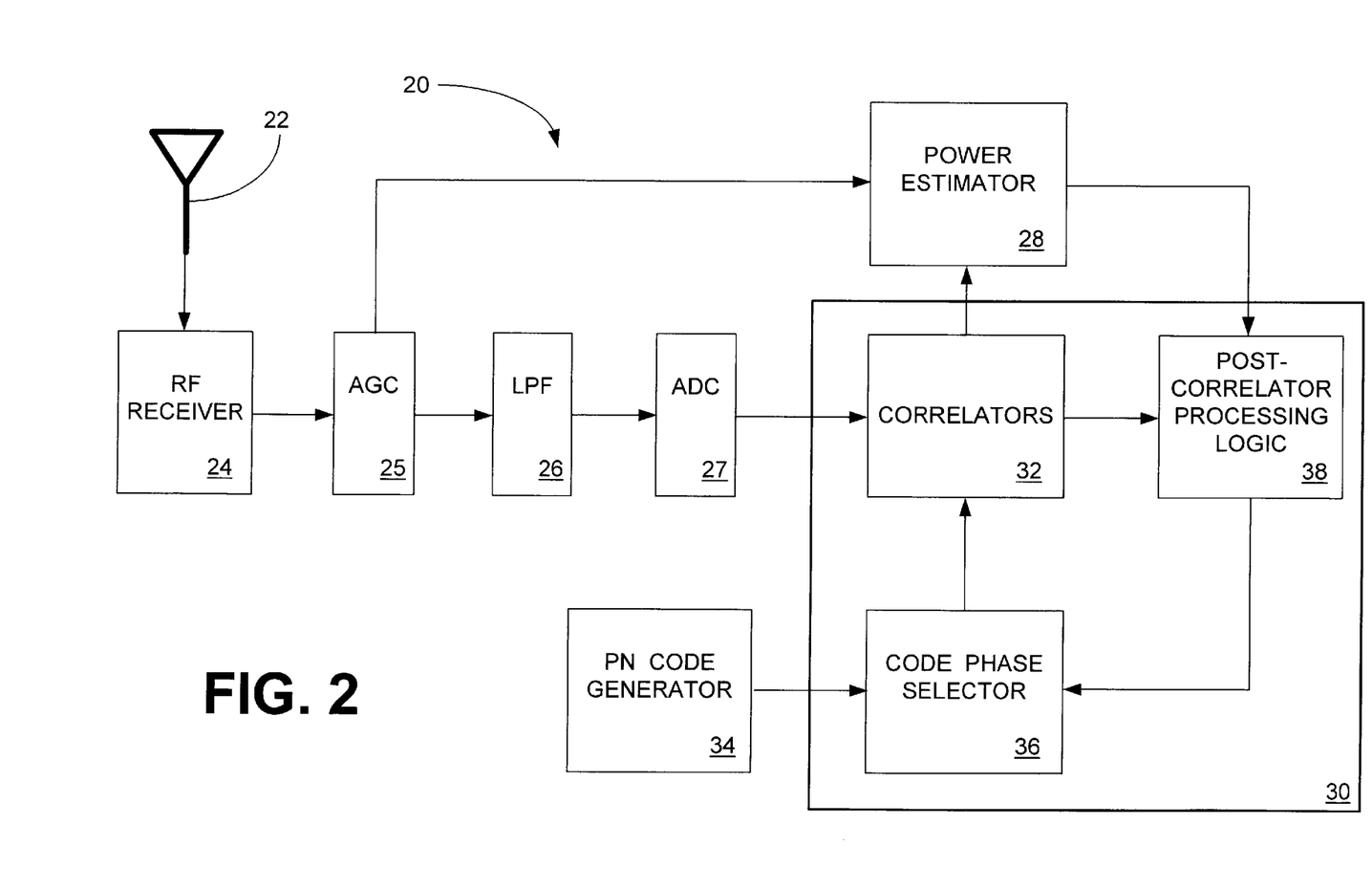
FIG. 2 is a schematic diagram of receiving circuitry in a wireless transceiver.

FIG. 2 is a generalized schematic diagram of the receiver circuitry 20 in the mobile station 12. The receiver 20 includes a radio frequency (RF) antenna 22 that receives analog signals from the base stations 14A–D and delivers the signals to an RF receiver 24. The RF receiver 24 down-converts the incoming signals to baseband and delivers the baseband signals to an automatic gain control (AGC) circuit 25. A low-pass filter (LPF) 26 blocks all but the baseband elements of the incoming signal. An analog-to-digital (A/D) converter 27 samples the baseband signal and delivers the resulting digital signal to a search-and-acquisition block 30.

The search-and-acquisition block 30 conducts the search for pilot signals from the base stations. In some implementations, the search-and-acquisition circuitry 30 also demodulates incoming data signals after the search-and-acquisition process has aligned the mobile station with the nearest base station. The search-and-acquisition circuitry 30 includes at least one correlator 32 that searches for pilot signals at selected code phases of a predetermined spreading sequence. Most CDMA receivers include at least two correlators, one for each of the in-phase (I) and quadrature (Q) components of the baseband signal. In many implementations, the CDMA receiver 20 includes two correlators for each of the I and Q components of the baseband signal.

The spreading sequence is generated by a PN sequence generator 34 that is selected from any one of several types, including linear feedback shift registers (LFSRs), Gold code generators, and Kasami code generators. A code phase selector 36 receives the PN code from the sequence generator 34 and, in response to a command provided by a post-correlator processing block 38, delivers the PN sequence to the correlator 32 at a selected one of the possible code phases. The correlator 32 performs a cross-correlation between the baseband signal and the selected code phase of the PN sequence over a correlation period of a given duration, commonly 64 chips. The resulting cross-correlation output indicates the degree of alignment between the baseband signal and the selected code phase of the PN sequence.

The post-correlator processing block 38 analyzes the cross-correlation output to determine whether any component of the incoming signal is sufficiently aligned with the selected code phase of the PN sequence to constitute one of the pilot signals. At the end of each correlation period, the code-phase selector 36 selects another code phase of the spreading sequence for delivery to the correlator 32. In general, the code phase selector 36 steps the code phase by a fraction of a chip (e.g., ½-chip). However, after encountering a pilot signal at one code phase, the processing block 38 selects a non-consecutive code phase offset by some predetermined number of chips (e.g., 64 chips) from the code phase at which the pilot signal was acquired.

A power estimation circuit 28 receives the cross-correlation output from each correlator 32 and determines the power level of the cross-correlation output. The power estimation circuit 28 delivers its output to the post-correlator processing block 38 for use in searching for pilot signals, as described below.

Figure 3:
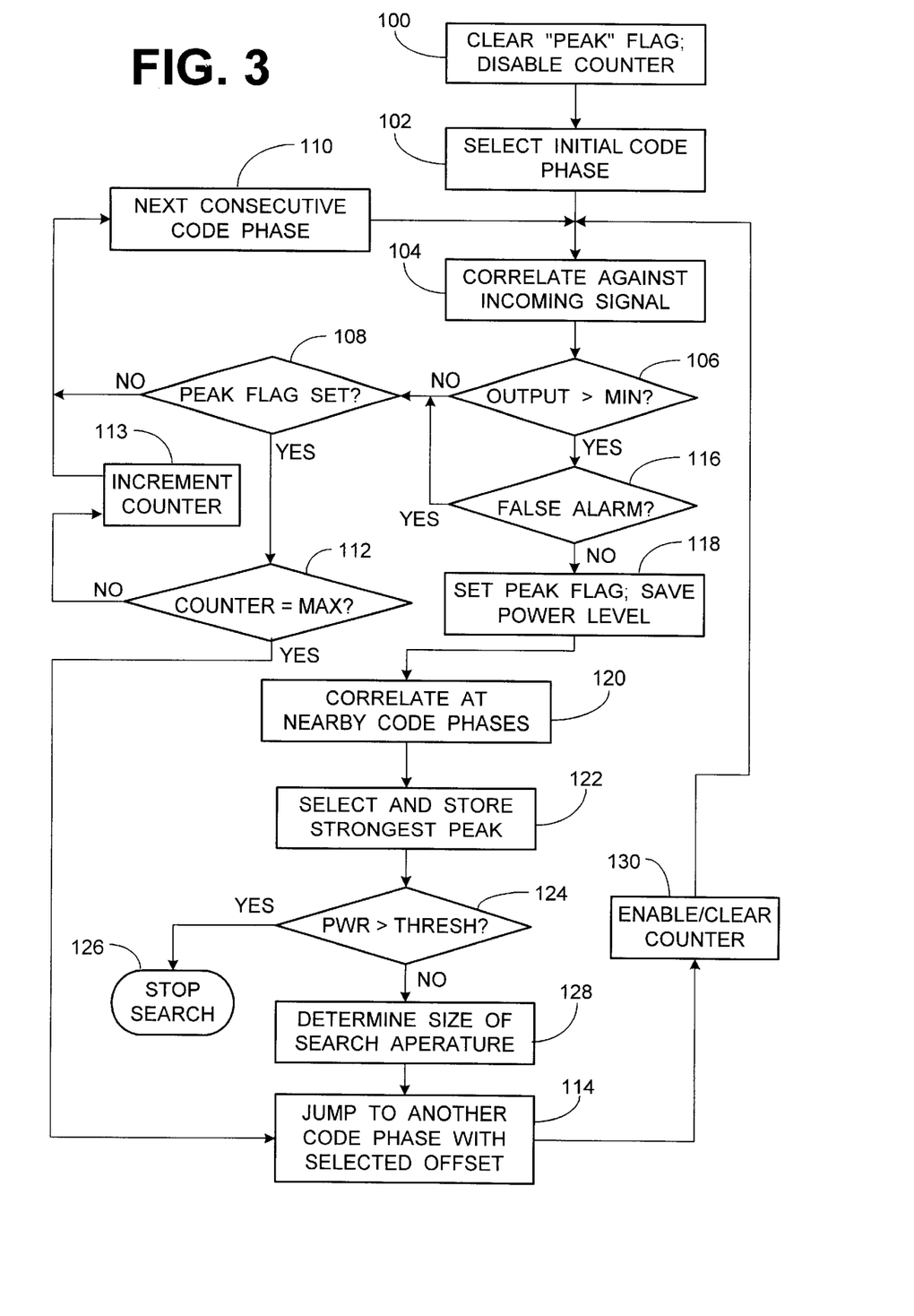
FIG. 3 is a flow chart of a process for searching for and detecting a signal from the nearest base station in a wireless communication system.

FIG. 3 is a flow chart for the operation of the post-correlator processing block 38 during the search for pilot signals from base stations. The processing block begins the search process by clearing a "peak" flag and disabling a counter (step 100). The counter establishes the size of the aperture over which the mobile station searches for a pilot signal. In general, the mobile station does not confine its search to an aperture of a particular size until at least one pilot signal has been acquired, so the counter is initially disabled. The "peak" flag indicates whether any pilot signals have been acquired. In this example, a cleared flag indicates that no pilot signal has been acquired yet. A set flag indicates that at least one pilot signal has been found.

The processing block next instructs the code phase selector block 36 to deliver the PN sequence to the correlator 32 at a selected initial code phase (step 102). In most situations, the processing block 38 is preconfigured with a particular initial code phase at which the mobile station begins its search every time it is powered up. The processing block 38 also instructs the correlator 32 to start performing a correlation between the selected code phase and the incoming baseband signal (step 104). At the end of the correlation period, the processing block 38 compares the correlation output from the correlator 32 to a stored minimum value (step 106). If the correlation output does not exceed the minimum value, the processing block 38 determines that no pilot signal exists at the selected code phase. When no pilot signal exists, the processing block 38 determines whether the "peak" flag has been set (step 108). If not, the processing block 38 instructs the code phase selector 36 to step to the next consecutive code phase offset and deliver the PN sequence to the correlator 32 (step 110).

The correlator 32 then enters another correlation period, during which it correlates the incoming signal against the PN sequence at the newly selected code phase (step 104). The processing block 38 continues to increment the reference signal by one code phase, or by an increment equal to a fraction of one code phase, until the cross-correlation output is large enough to suggest the existence of a pilot signal. The processing block 38 initially establishes a very low minimum value in an attempt to ensure that even very faint pilot signals are detected.

If the processing block determines that no pilot signal is present at the selected code phase (step 106) and that the peak flag is set (step 108), indicating that at least one pilot signal has been found, the processing block compares the value in the counter to a predetermined maximum value (step 112). If the counter value is less than the maximum value, the processing block increments the counter (step 113) and instructs the code phase selector to increment to the next consecutive code phase (step 110). If, on the other hand, the counter value has reached the maximum value, the mobile station has searched over the entire aperture without encountering a pilot signal. In this situation, the processing block 38 abandons the search at this window of code phases and instructs the code phase selector 36 to jump to another code phase with a predetermined offset from the current code phase, as described below (step 114).

Upon receiving a cross-correlation output that is sufficiently large to suggest the existence of a pilot signal, the receiver determines whether a pilot signal actually exists at the selected code phase or if, instead, the large cross-correlation output was a false alarm (step 116). To do so, the receiver continues correlating at the selected code phase for at least one and typically more (e.g., 2–10) additional correlation periods. If the combined cross-correlation outputs of the additional correlation periods do not exceed some threshold value, the processing block 38 declares a false alarm condition and continues searching for pilot signals as discussed above, treating the cross-correlation output as though it did not exceed the minimum value (step 106). Otherwise, the processing block sets the peak flag and stores the measured power level of the acquired pilot signal (step 118).

Upon detecting a pilot signal at a selected code phase, the receiver correlates the incoming signal at one or more nearby code phases to determine whether the pilot signal is stronger at one of these nearby code phases (step 120). Multipath reflection of a pilot signal often causes that signal to generate a large cross-correlation output at more than one code phase. The processing block determines which of these code phases produces the strongest signal by instructing the code phase selector to increment by a fraction of one code phase for each of the next several correlation periods. The processing block then stores the code phase that produces the strongest signal as the location of the base station (step 122).

Once the receiver has pinpointed the code phase associated with a base station, the processing block 38 compares the power level of the cross-correlation output at that code phase to a predetermined threshold value (step 124). If the power level exceeds the threshold level, the detected signal is so strong that the receiver can halt its search for other base stations (step 126). In general, the threshold value is selected to ensure that the acquired base station is closer to the receiver than all other base stations.

After acquiring a base station that is not sufficiently close to halt the search, the receiver continues searching at a code phase that is offset by multiple chips from the code phase associated with the acquired base station. As described above, many synchronized wireless networks, such as CDMA networks, assign relatively few of the many possible code phases and distribute the assigned code phases evenly, separating the assigned code phases by some predetermined number of chips (referred to here as the "base station offset," or "O"). In these networks, acquisition of one base station at a selected code phase theoretically narrows the receiver's search to those code phases that are separated from the selected code phase by some multiple of the base station offset. However, as discussed above, propagation delays between the base stations and the receiver skew the arrival times of the pilot signals at the receiver. As a result, upon acquiring a base station's pilot signal at a code phase K, the receiver does not jump immediately to the code phase K+O. Instead the receiver creates a "window" or "aperture" (A) having a selected chip length (step 128) and then jumps to the code phase K+O−Δ (step 114), and searches over an interval 2Δ. If no pilot signal is found, the receiver jumps to the code phase K+2(O)−Δ and searches over an interval of 2Δ. The processing block enables and clears the counter upon jumping to a non-consecutive code phase (step 130). The maximum counter value (MAX) is selected to match the size of the aperture.

In some implementations, the size of the aperture is established once and is programmed into the receiver. However, because the receiver does not need to acquire a base station that is more distant than a previously acquired station, more efficient implementations allow the receiver to calculate the aperture based upon the strength of a previously acquired pilot signal. The strength of a pilot signal is directly related to the receiver's distance from the corresponding base station, which in turn is directly related to the propagation delay between the base station and the receiver. Upon acquiring a pilot signal of a particular strength, the receiver can disregard all weaker pilot signals and set the aperture size to ignore all signals that experience a longer propagation delay. As a result, a receiver that dynamically adjusts the aperture size in this manner will, in most circumstances, acquire progressively stronger signals, and thus progressively nearer base stations, during the course of the search-and-acquisition process. The receiver continues the search-and-acquisition process until it acquires a sufficiently strong pilot signal or until it has searched all possible code phases of the spreading sequence.

Figure 4:
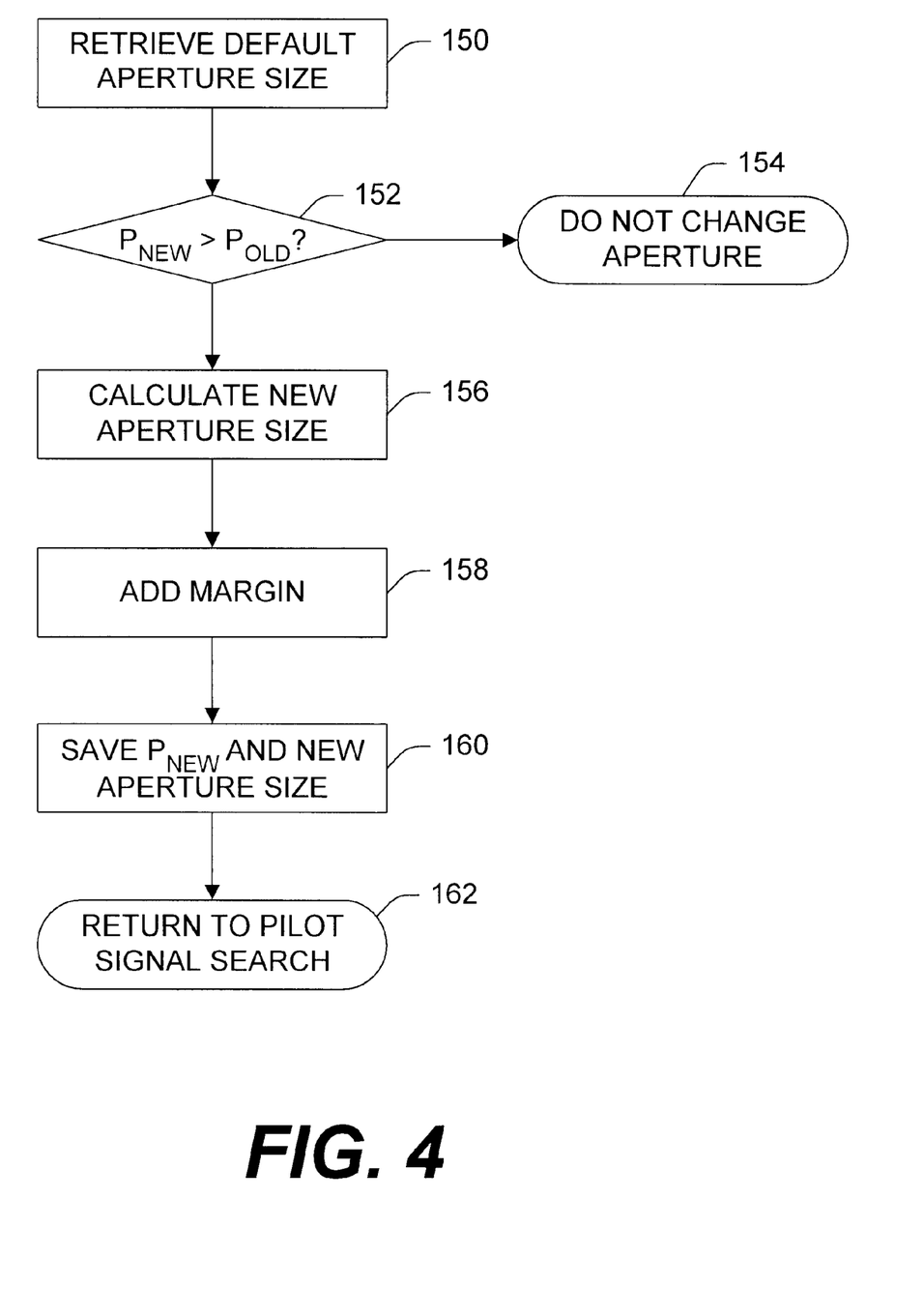
FIG. 4 is a flowchart illustrating one technique for establishing the size of the search aperture.

FIG. 4 is a flowchart of one technique for establishing the size of the search aperture. As described above, the processing block usually begins with a predetermined initial aperture size $\tau_1$ (step 150). The initial size is selected to allow for propagation delays up to a particular maximum amount. Delays longer than this amount are typically associated with base stations that are too far away from the mobile station to be useful. The desired aperture size $\tau$ is roughly related to the distance d of the base station from the mobile station by the equations $\tau=d/c$, where c equals the speed of light. Likewise, the power level P of a pilot signal is inversely proportional to the distance between the mobile station and the base station that produced the pilot signal. Therefore, the processing block 38 can decrease the aperture size as the power level increases, according to the following formula:

$$\tau_1 P_1 \sim \tau_2 P_2,$$

where $\tau_1$ and $P_1$ are the aperture size and power level, respectively, associated with one acquired pilot signal, and where $\tau_2$ and $P_2$ are the aperture size and power level associated with another acquired pilot signal.

Upon acquiring a new pilot signal, the processing block 38 compares the power level ($P_{new}$) of the newly acquired signal to the previously stored power level ($P_{old}$) (step 152). If $P_{new}$ does not exceed $P_{old}$, the processing block 38 does not change the aperture size (step 154). If, on the other hand, $P_{new}$ does exceed $P_{old}$, the processing block decides that the base station producing the newly acquired pilot signal is closer to the mobile station than any previously encountered base station and adjusts the aperture size accordingly. The processing block calculates the new aperture size ($\tau_{new}$) using the formula $\tau_{old} P_{old} \sim \tau_{new} P_{new}$ (step 156). The processing block then adds a constant value $\mu$ that allows for uncertainty in the power level, such as that caused by signal fading, to ensure that the aperture is not too small (step 158). The processing block then stores $P_{new}$ and $\tau_{new}$ (step 160) and resumes its search for pilot signals (step 162).

The invention is implemented in analog or digital electronic circuitry, in computer hardware, firmware, or software, or in combinations of these technologies. Some embodiments are realized, at least in part, in a computer program product tangibly embodied in a machine-readable storage device for execution by a computer processor. The processor carries out the invention by executing instructions organized into program modules, operating on input data and generating output. Suitable processors include general and special purpose microprocessors and digital signal processors (DSPs). Storage devices suitable for tangibly embodying computer program instructions include all forms of nonvolatile memory, such as semiconductor memory devices, including EPROM, EEPROM, and flash memory devices; magnetic disks such as internal hard disks and removable disks; magneto-optical disks; and CD-ROM. Some embodiments are carried out in specially-designed ASICs (application-specific integrated circuits) instead of or in addition to the technologies described above.

A number of embodiments of the present invention have been described. Nevertheless, it will be understood that various modifications may be made without departing from the spirit and scope of the invention. For example, while the invention has been described in terms of direct sequence spread spectrum (DSSS) systems, such as CDMA networks, it is useful with other technologies as well, including frequency hopped spread spectrum systems. The invention also is not limited to use in mobile stations. Moreover, the aperture over which the receiver searches need not be symmetric about a code phase, i.e., the receiver need not search over an aperture of $2\Delta$ centered on a particular code phase. In some embodiments, the aperture begins some predetermined number of chips ($\Delta_{early}$) before a selected code phase and ends some predetermined number of chips ($\Delta_{late}$) after the code phase, where $\Delta_{early} \neq \Delta_{late}$. Accordingly, other embodiments are within the scope of the following claims.

What is claimed is:

1. A method for use in selecting one of multiple nearby base stations to facilitate communication over a wireless network, where each base station transmits a pilot signal that includes a spreading signal transmitted at one of many possible phase offsets, the method comprising:

(a) selecting an initial one of the possible phase offsets of the spreading signal;

(b) correlating a received signal against the spreading signal at consecutive ones of the possible phase offsets, beginning at the selected initial phase offset, until a component of the received signal and the spreading signal are aligned, indicating the detection of the pilot signal from one of the base stations;

(c) thereafter selecting a non-consecutive one of the possible phase offsets of the spreading signal; and (d) correlating the received signal against the spreading signal at the selected non-consecutive phase offset to determine whether any other component of the received signal is aligned with the spreading signal at the selected non-consecutive phase offset.

2. The method of claim 1, further comprising, if no component of the received signal is aligned with the spreading signal at the selected non-consecutive phase offset, correlating the received signal against consecutive ones of the possible phase offsets, beginning at the selected non-consecutive phase offset, until another component of the received signal is aligned with the spreading signal, indicating the detection of the pilot signal from another of the base stations.

3. The method of claim 2, further comprising thereafter selecting another non-consecutive one of the possible phase offsets at which to correlate the spreading signal against the received signal.

4. The method of claim 3, wherein the selected initial phase offset and the selected non-consecutive phase offsets are separated from each other by a predetermined number of possible phase offsets.

5. The method of claim 1, wherein the selected initial phase offset and the selected non-consecutive phase offset are separated from each other by a predetermined number of possible phase offsets.

6. The method of claim 1, further comprising selecting the base station that produces the pilot signal having the greatest received signal strength.

7. The method of claim 1, further comprising ignoring any pilot signal with a received signal strength that is below a predetermined threshold.

8. The method of claim 1, wherein the possible phase offsets are equally spaced.

9. The method of claim 1, wherein selecting a non-consecutive one of the possible phase offsets includes:

(a) selecting a phase offset at which a pilot signal is expected to occur; and (b) defining an aperture that begins a predetermined number of chips of the spreading signal before the selected phase offset.

10. The method of claim 9, wherein the aperture ends a predetermined number of chips of the spreading signal after the selected phase offset.

11. The method of claim 10, wherein the aperture includes equal numbers of chips before and after the selected phase offset.

12. The method of claim 10, wherein the aperture includes unequal numbers of chips before and after the selected phase offset.

13. The method of claim 9, wherein correlating the received signal against the spreading sequence of the selected non-consecutive phase offset includes correlating of consecutive phase offsets across the aperture to allow for propagation delay in the received signal.

14. A receiver circuit for use in selecting one of multiple nearby base stations to facilitate communication over a wireless network, where each base station transmits a pilot signal that includes a spreading signal transmitted at one of many possible phase offsets, the receiver circuit comprising:

(a) a spreading signal generator configured to generate a copy of the spreading signal;

(b) a phase offset selector configured to receive the copy of the spreading signal from the spreading signal generator and to output the spreading signal at selected ones of the possible phase offsets;

(c) a correlator configured to receive the spreading signal from the phase offset selector and to correlate a received signal against the spreading signal at each of the selected phase offsets to determine whether any component of the received signal is aligned with the spreading signal at any of the selected phase offsets, (d) control circuitry configured to:

(1) instruct the phase offset selector to output the spreading signal at consecutive ones of the possible phase offsets, beginning at a selected initial phase offset, until a component of the received signal and the spreading signal are aligned, indicating the detection of the pilot signal from one of the base stations; and (2) thereafter instruct the phase offset selector to output the spreading signal at a selected non-consecutive one of the possible phase offsets to determine whether any other component of the received signal is aligned with the spreading signal at the selected non-consecutive phase offset.

15. The receiver circuit of claim 14, wherein the control circuitry is configured to instruct the phase offset selector to output the spreading signal at consecutive ones of the possible phase offsets, beginning at the selected non-consecutive phase offset, if no component of the received signal is aligned with the spreading signal at the selected non-consecutive phase offset.

16. The receiver circuit of claim 15, wherein the control circuitry is configured to instruct the phase offset selector to output the spreading signal at another selected non-consecutive one of the possible phase offsets upon detecting another pilot signal.

17. The receiver circuit of claim 16, wherein the selected initial phase offset and the selected non-consecutive phase offsets are separated from each other by a predetermined number of possible phase offsets.

18. The receiver circuit of claim 14, wherein the selected initial phase offset and the selected non-consecutive phase offset are separated from each other by a predetermined number of possible phase offsets.

19. The receiver circuit of claim 14, wherein the control circuitry is configured to select the base station that produces the pilot signal having the greatest received signal strength.

20. The receiver circuit of claim 14, wherein the control circuitry is configured to ignore any pilot signal with a received signal strength that is below a predetermined threshold.

21. The receiver circuit of claim 14, wherein the possible phase offsets are equally spaced.

22. The receiver circuit of claim 14, wherein the control circuitry, in instructing the phase offset selector to output the spreading signal at a selected non-consecutive one of the possible phase offsets, is configured to:

(a) select a phase offset at which a pilot signal is expected to occur; and (b) define an aperture that begins a predetermined number of chips of the spreading signal before the selected phase offset.

23. The receiver circuit of claim 22, wherein the aperture ends a predetermined number of chips of the spreading signal after the selected phase offset.

24. The receiver circuit of claim 23, wherein the aperture includes equal numbers of chips before and after the selected phase offset.

25. The receiver circuit of claim 23, wherein the aperture includes unequal numbers of chips before and after the selected phase offset.

26. The receiver circuit of claim 22, wherein the control circuitry is configured to instruct the phase offset selector to output the spreading signal at phase offsets across the aperture to allow for propagation delay in the received signal.

27. A method for use in selecting one of multiple nearby base stations to facilitate communication over a wireless network, the method comprising:

(a) receiving a signal that includes pilot signals from multiple base stations, the pilot signals transmitted at selected code phases of a spreading signal;

(b) generating a reference signal that includes a selected code phase of the spreading signal;

(c) correlating the received signal against the reference signal to obtain a correlation output;

(d) if the correlation output is below a predetermined threshold value, stepping the reference signal to another code phase that follows the selected code phase consecutively; and (e) if the correlation output is above a predetermined threshold value, stepping the reference signal to another code phase that does not follow the selected code phase consecutively.

28. The method of claim 27, wherein stepping the reference signal to another code phase that does not follow the selected code phase consecutively includes stepping the reference signal to another code phase that is separated from the selected code phase by a predetermined code phase offset.

29. The method of claim 27, wherein stepping the reference signal to another code phase that does not follow the selected code phase consecutively includes stepping the reference signal to another code phase that is separated from the selected code phase by a predetermined code phase offset less a selected aperture offset.

30. The method of claim 29, further comprising correlating the received signal against the reference signal at the other code phase to obtain another correlation output.

31. The method of claim 30, further comprising correlating the received signal against the reference signal at consecutive code phases, beginning at the other code phase, until the second correlation output exceeds a predetermined threshold or until the received signal is correlated against all consecutive code phases within an aperture of a selected size.

32. A receiver for selecting one of a plurality of base stations comprising:
receiver unit for receiving a pilot signal that includes a spreading signal transmitted with a predetermined phase offset, comprising:
a spreading signal generator configured to generate a copy of the spreading signal;
a phase offset selector configured to receive the copy of the spreading signal from the spreading signal generator and to output the spreading signal at the predetermined phase offset;
a correlator configured to receive the spreading signal from the phase offset selector and to correlate a received signal with the spreading signal at the predetermined phase offset to determine whether a component of the received signal is aligned with the spreading signal at the predetermined phase offset;
control circuitry configured to instruct the phase offset selector to output the spreading signal at consecutive phase offsets of possible phase offsets until a component of the received signal and the spreading signal are aligned; and
instruct the phase offset selector to output the spreading signal at a selected non consecutive phase offset of possible phase offsets to determine whether any component of the received signal is aligned with the spreading signal at the selected non-consecutive phase offset.

33. A receiver for selecting one of a plurality of base stations according to claim 32, wherein the alignment of the component of the received signal and the spreading signal indicates the detection of the pilot signal from the base station.

34. A receiver for selecting one of a plurality of base stations according to claim 33, wherein the control circuitry is configured to instruct the phase offset selector to output the spreading signal at a consecutive one of the possible phase offsets, beginning at the selected non-consecutive phase offset, if no component of the received signal is aligned with the spreading signal at the selected non-consecutive phase offset.

35. A receiver for selecting one of a plurality of base stations according to claim 32, wherein the control circuitry is configured to instruct the phase offset selector to output the spreading signal at second selected non-consecutive one of the possible phase offsets upon detecting a second pilot signal.

36. A receiver for selecting one of a plurality of base stations according to claim 32, wherein a selected initial phase offset and the selected non-consecutive phase offset are separated from each other by a predetermined number of phase offsets.

37. The receiver circuit of claim 32, wherein the control circuitry is configured to select a base station that produces a pilot signal having the greatest received signal strength.

38. A receiver for selecting one of a plurality of base stations according to claim 32, wherein the control circuitry is configured to ignore a pilot signal with a received signal strength that is below a predetermined threshold.

39. A receiver for selecting one of a plurality of base stations according to claim 32, wherein the possible phase offsets are equally spaced.

40. A receiver for selecting one of a plurality of base stations according to claim 32, wherein the control circuitry, in instructing the phase offset selector to output the spreading signal at a selected non-consecutive one of the possible phase offsets, is configured to:
select a phase offset at which a pilot signal is expected to occur; and
define an aperture that begins a predetermined number of chips of the spreading signal before the selected phase offset.

41. A receiver for selecting one of a plurality of base stations according to claim 40, wherein the aperture ends a predetermined number of chips of the spreading signal after the selected phase offset.

42. A receiver for selecting one of a plurality of base stations according to claim 40, wherein the aperture includes equal numbers of chips before and after the selected phase offset.

43. A receiver for selecting one of a plurality of base stations according to claim 40, wherein the aperture includes unequal numbers of chips before and after the selected phase offset.

44. A receiver for selecting one of a plurality of base stations according to claim 40, wherein the control circuitry is configured to instruct the phase offset selector to output the spreading signal at phase offsets across the aperture to allow for propagation delay in the received signal.

45. A receiver for selecting one of a plurality of base stations, comprising:
receiver means for receiving a pilot signal that includes a spreading signal transmitted with a predetermined phase offset;
means for generating a spreading signal configured to generate a copy of the spreading signal;
means for selecting a phase offset configured to receive the copy of the spreading signal from the spreading signal generator and to output the spreading signal at the predetermined phase offset;
means for correlating configured to receive the spreading signal from the phase offset selector and to correlate a received signal with the spreading signal at the predetermined phase offset to determine whether a component of the received signal is aligned with the spreading signal at the predetermined phase offset;
means for controlling configured to:
instruct the means for selecting a phase offset to output the spreading signal at consecutive phase offsets until a component of the received signal and the spreading signal are aligned; and
instruct the means for selecting a phase offset to output the spreading signal at a selected non-consecutive phase offset to determine whether any component of the received signal is aligned with the spreading signal at the selected non-consecutive phase offset.

46. A receiver for selecting one of a plurality of base stations according to claim 45, wherein the receiver comprises a CDMA wireless receiver.

47. A receiver for selecting one of a plurality of base stations according to claim 45, wherein the means for controlling comprises a micro-controller.

48. A receiver for selecting one of a plurality of base stations according to claim 45, wherein the means for controlling comprises a digital signal processor.

49. A receiver for selecting one of a plurality of base stations according to claim 45, wherein the means for controlling comprises an application specific integrated circuit.

* * * * *